US012114176B2

United States Patent
Kuno et al.

(10) Patent No.: US 12,114,176 B2
(45) Date of Patent: Oct. 8, 2024

(54) PROPAGATION CHARACTERISTIC ESTIMATION DEVICE, PROPAGATION CHARACTERISTIC ESTIMATION METHOD, AND PROPAGATION CHARACTERISTIC ESTIMATION PROGRAM

(71) Applicant: NIPPON TELEGRAPH AND TELEPHONE CORPORATION, Tokyo (JP)

(72) Inventors: Nobuaki Kuno, Musashino (JP); Wataru Yamada, Musashino (JP); Takatsune Moriyama, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 382 days.

(21) Appl. No.: 17/765,114

(22) PCT Filed: Oct. 4, 2019

(86) PCT No.: PCT/JP2019/039353
§ 371 (c)(1),
(2) Date: Mar. 30, 2022

(87) PCT Pub. No.: WO2021/064999
PCT Pub. Date: Apr. 8, 2021

(65) Prior Publication Data
US 2022/0345899 A1   Oct. 27, 2022

(51) Int. Cl.
*H04B 17/00*   (2015.01)
*G01S 5/02*   (2010.01)
(Continued)

(52) U.S. Cl.
CPC .............. *H04W 16/18* (2013.01); *G06T 7/13* (2017.01); *H04B 17/309* (2015.01);
(Continued)

(58) Field of Classification Search
None
See application file for complete search history.

(56) References Cited

U.S. PATENT DOCUMENTS 7,260,408 B2 * 8/2007 Friday .................... H04B 17/27
342/357.43
7,379,710 B2 * 5/2008 Watanabe ............... G06F 30/20
455/67.11

(Continued)

FOREIGN PATENT DOCUMENTS

JP   2014158110 A   8/2014
JP   2019122008 A   7/2019

OTHER PUBLICATIONS

Nobuaki Kuno and Yasushi Takatori, Prediction Method by Deep-Learning for Path Loss Characteristics in an Open-Square Environment, 2018 International Symposium on Antennas and Propagation (ISAP 2018), Oct. 23, 2018.

(Continued)

*Primary Examiner* — Tuan A Tran
(74) *Attorney, Agent, or Firm* — Harness, Dickey & Pierce, P.L.C.

(57) ABSTRACT

Provided are: an extraction unit that, based on input information from an external source, extracts position information regarding a transmitting station and a receiving station and the frequency of radio waves transmitted by the transmitting station; a calculation unit that calculates the three-dimensional distance between the transmitting station and the receiving station and the free space loss of radio waves based on the position information and the frequency; a processing unit that performs processing for, with use of a (Continued)

two-dimensional image of a region that includes the transmitting station and the receiving station, extracting the edges of structures that reflect radio waves in the two-dimensional image; a generation unit that generates input data for use in machine learning, based on the position information, the three-dimensional distance, the free space loss, and the edge; and a learning unit that performs machine learning to estimate the propagation characteristics of radio waves between the transmitting station and the receiving station with use of the input data generated by the generation unit.

4 Claims, 7 Drawing Sheets

(51) Int. Cl.
  G06T 7/13      (2017.01)
  H04B 17/309    (2015.01)
  H04W 16/18     (2009.01)
  H04W 16/22     (2009.01)
  H04W 40/00     (2009.01)
(52) U.S. Cl.
  CPC ......... G06T 2207/10032 (2013.01); G06T 2207/20081 (2013.01); G06T 2207/30184 (2013.01)

(56) References Cited

U.S. PATENT DOCUMENTS

| | | | | |
|---|---|---|---|---|
| 7,634,265 B2* | 12/2009 | Sugahara | ........... | H04B 17/3912 455/418 |
| 8,340,684 B2* | 12/2012 | Miura | ............ | H04B 17/27 455/67.11 |
| 8,355,680 B2* | 1/2013 | Nyu | ............ | H04W 16/20 455/67.11 |
| 8,385,908 B2* | 2/2013 | Ivarez Medina et al. | | H04L 41/147 455/446 |
| 8,436,768 B2* | 5/2013 | Bull | ............ | G01S 5/02216 342/357.25 |
| 8,442,552 B2* | 5/2013 | Gallegos | ............ | H04B 17/3913 455/456.1 |
| 8,630,676 B2* | 1/2014 | Lee | ............ | H04B 7/0617 455/407 |
| 9,121,923 B2* | 9/2015 | Bull | ............ | G01S 5/0215 |
| 9,438,499 B2* | 9/2016 | Cole | ............ | H04L 41/12 |
| 10,333,638 B2* | 6/2019 | Zhihua | ............ | H04B 17/3913 |
| 10,887,029 B2* | 1/2021 | Lee | ............ | H04B 17/391 |
| 11,076,328 B2* | 7/2021 | Lu | ............ | H04W 36/00835 |
| 11,395,152 B2* | 7/2022 | Lee | ............ | H04B 17/30 |
| 11,653,276 B2* | 5/2023 | Lu | ............ | H04W 36/324 455/440 |
| 2004/0259554 A1* | 12/2004 | Rappaport | ............ | H04W 16/18 455/446 |
| 2007/0010207 A1* | 1/2007 | Dooley | ............ | H04W 24/00 455/67.11 |
| 2009/0203373 A1* | 8/2009 | Alvarez Medina | ... | H04L 41/147 455/423 |
| 2018/0278349 A1* | 9/2018 | Zhihua | ............ | H04W 24/06 |

OTHER PUBLICATIONS

Nobuaki Kuno et al., Convolutional Neural Network for Prediction Method of Path Loss Characteristics considering Diffraction and Reflection in an Open-Square Environment, URSI AP-RASC 2019, Mar. 9, 2019.

* cited by examiner

PROPAGATION CHARACTERISTIC ESTIMATION DEVICE, PROPAGATION CHARACTERISTIC ESTIMATION METHOD, AND PROPAGATION CHARACTERISTIC ESTIMATION PROGRAM

CROSS-REFERENCE TO RELATED APPLICATIONS

This application is a 371 U.S. National Phase of International Application No. PCT/JP2019/039353, filed on Oct. 4, 2019. The entire disclosure of the above application is incorporated herein by reference.

TECHNICAL FIELD

The present invention relates to a propagation characteristic estimation device, a propagation characteristic estimation method, and a propagation characteristic estimation program.

BACKGROUND ART

In wireless communication systems, methods for estimating the propagation loss of radio waves transmitted from a transmitting station to a receiving station are roughly classified into two types, namely site-specific methods and site-general methods. A site-specific estimation method is a method of estimating location-specific propagation loss. On the other hand, a site-general estimation method is a method of estimating a general propagation characteristic trend that is not location-specific.

For example, in a site-specific estimation method, the propagation loss of radio waves is estimated by mainly using land use distribution and topographical information issued by the Geospatial Information Authority of Japan or the like, and giving consideration to the influence of surrounding buildings (see PTL 1 and 2 and NPL 1 and 2).

CITATION LIST

Patent Literature

[PTL 1] JP 2014-158110A
[PTL 2] JP 2019-122008A

Non Patent Literature

[NPL 1] N. Kuno, Y. Takatori, "Prediction Method by Deep-Learning for Path Loss Characteristics in an Open-Square Environment," ISAP 2018, pp. 1-2, October 2018.

[NPL 2] N. Kuno, W. Yamada, M. Sasaki, Y. Takatori, "Convolutional Neural Network for Prediction Method of Path Loss Characteristics considering Diffraction. and Reflection in an Open-Square Environment," 2019 AP-RASC, pp. 1-3, March 2019.

SUMMARY OF THE INVENTION

Technical Problem

However, if the area that includes the transmitting station and the receiving station is large, the amount of surrounding building information that needs to be read in order to estimate the propagation loss of radio waves becomes very large, thus creating the problem of increases in the amount of memory used for reading building information and the amount of time required for reading.

An object of the present invention is to provide a propagation characteristic estimation device, a propagation characteristic estimation method, and a propagation characteristic estimation program that are capable of reducing the storage capacity and reading time required for data that is needed to estimate the propagation characteristics of radio waves.

Means for Solving the Problem

A propagation characteristic estimation device according to an aspect of the present invention is a propagation characteristic estimation device for estimating a propagation characteristic of radio waves between a transmitting station and a receiving station that perform wireless communication, the propagation characteristic estimation device including: an extraction unit configured to, based on input information from an external source, extract position information regarding the transmitting station and the receiving station and a frequency of radio waves transmitted by the transmitting station; a calculation unit configured to calculate a three-dimensional distance between the transmitting station and the receiving station and a free space loss of radio waves based on the position information and the frequency; a processing unit configured to perform processing for, with use of a two-dimensional image of a region that includes the transmitting station and the receiving station, extracting an edge of a structure that reflects radio waves in the two-dimensional image; a generation unit configured to generate input data for use in machine learning, based on the position information, the three-dimensional distance, the free space loss, and the edge; and a learning unit configured to perform machine learning to estimate a propagation characteristic of radio waves between the transmitting station and the receiving station with use of the input data generated by the generation unit.

Also, a propagation characteristic estimation method according to an aspect of the present invention is a propagation characteristic estimation method for estimating a propagation characteristic of radio waves between a transmitting station and a receiving station that perform wireless communication, the propagation characteristic estimation method including: an extraction step of, based on input information from an external source, extracting position information regarding the transmitting station and the receiving station and a frequency of radio waves transmitted by the transmitting station; a calculation step of calculating a three-dimensional distance between the transmitting station and the receiving station and a free space loss of radio waves based on the position information and the frequency; a processing step of performing processing for, with use of a two-dimensional image of a region that includes the transmitting station and the receiving station, extracting an edge of a structure that reflects radio waves in the two-dimensional image; a generation step of generating input data for use in machine learning, based on the position information, the three-dimensional distance, the free space loss, and the edge; and a learning step of performing machine learning to estimate a propagation characteristic of radio waves between the transmitting station and the receiving station with use of the input data that was generated.

DESCRIPTION OF EMBODIMENTS

Figure 1:
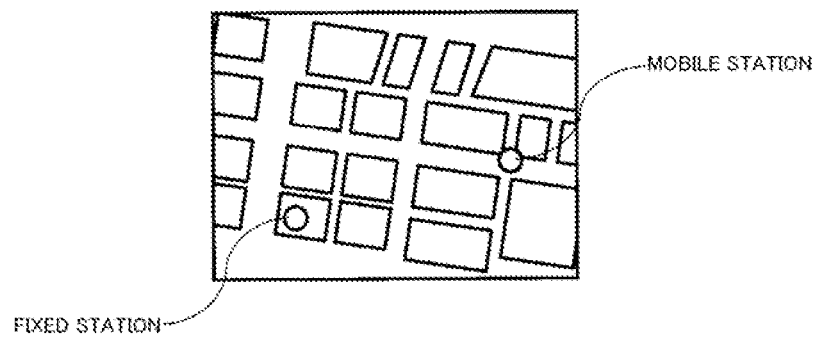
FIG. 1 is a diagram showing an overview of a propagation characteristic estimation method according to an embodiment.

Embodiments of a propagation characteristic estimation device and a propagation characteristic estimation method will be described below with reference to the drawings. FIG. 1 is a diagram showing an overview of the propagation characteristic estimation method according to an embodiment.

In the propagation characteristic estimation method according to one embodiment, the edges of buildings are extracted from a two-dimensional image that shows buildings, the ground surface state, and the like (e.g., a satellite photograph), and building information constituted by the edges is acquired. Then, the position of a fixed station (transmitting station) is set in the two-dimensional image, and the propagation characteristics at a mobile station (receiving station) are estimated. A neural network (see FIG. 4) capable of nonlinear regression is used for this estimation.

Figure 2:
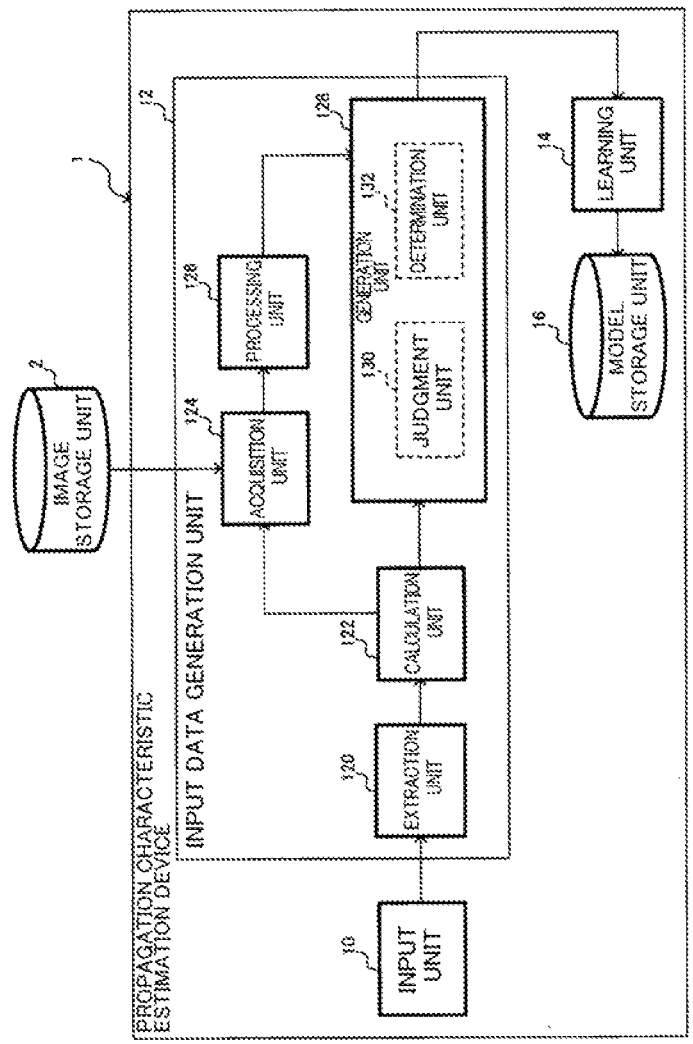
FIG. 2 is a functional block diagram showing functions of a propagation characteristic estimation device according to an embodiment.

FIG. 2 is a functional block diagram showing functions of a propagation characteristic estimation device 1 according to one embodiment. The propagation characteristic estimation device 1 acquires a two-dimensional image such as a satellite photograph from an image storage unit 2 that stores two-dimensional images that show buildings, the ground surface state, and the like (e.g., satellite photographs), and estimates the propagation characteristics of radio waves inside an area included in the two-dimensional image. The image storage unit 2 may be provided in the propagation characteristic estimation device 1.

As shown in FIG. 2, the propagation characteristic estimation device 1 includes an input unit 10, an input data generation unit 12, a learning unit 14, and a model storage unit 16. The input unit 10 includes the functionality of an input device that, in accordance with a user operation, inputs, to the input data generation unit 12, position information that indicates the positions of a transmitting station and a receiving station for which radio wave propagation characteristics are to be estimated, and information that includes the frequency f of radio waves transmitted by the transmitting station, for example.

The input data generation unit 12 includes an extraction unit 120, a calculation unit 122, an acquisition unit 124, a processing unit 126, and a generation unit 128.

The extraction unit 120 extracts information such as the position information for the transmitting station and the receiving station and the radio wave frequency f from the information that was received from the input unit 10, and outputs the extracted information to the calculation unit 122.

Using the information that was received from the extraction unit 120, the calculation unit 122 calculates the three-dimensional distance (slope distance ($d_{3D}$) between the transmitting station and the receiving station and a free space loss $L_{FS}$ of radio waves, and outputs the calculation results and the information that was received from the extraction unit 120 to the acquisition unit 124 and the Generation unit 128.

For example, the calculation unit 122 calculates the slope distance $d_{3D}$ using Expression 1 below. Here, the position of the transmitting station is $P_{Tx}=(x_{Tx}, y_{Tx}, z_{Tx})$, and the position of the receiving station is $P_{Rx}=(x_{Rx}, y_{Rx}, z_{Rx})$.

[Math 1]

$$d_{3D}=\sqrt{(x_{Tx}-x_{Rx})^2+(y_{Tx}-y_{Rx})^2+(z_{Tx}-z_{Rx})^2} \quad (1)$$

Also, the calculation unit 122 calculates the free space loss $L_{FS}$ using Expression 2 below. The free space loss $L_{FS}$ is used as a reference for propagation loss L that is learned by the later-described learning unit 14.

[Math 2]

$$\text{free space loss } L_{FS}\,[db]=32.4+20\,\log_{10}d_{3D}\,[km]+20\,\log_{10}f\,[GHz] \quad (2)$$

The acquisition unit 124 acquires a two-dimensional image such as a satellite photograph from the image storage unit 2, and outputs the acquired two-dimensional image and information such as the calculation results received from the calculation unit 122 to the processing unit 126. For example, the acquisition unit 124 acquires a two-dimensional image of a predetermined area (estimation range) that includes a transmitting station and a receiving station.

Using the two-dimensional image received from the acquisition unit 124, the processing unit 126 performs processing for extracting edges of a structure (e.g., a building) that reflects radio waves in the two-dimensional image, and outputs information (e.g., an edge image) that includes the extracted edges to the generation unit 128.

Figure 3:
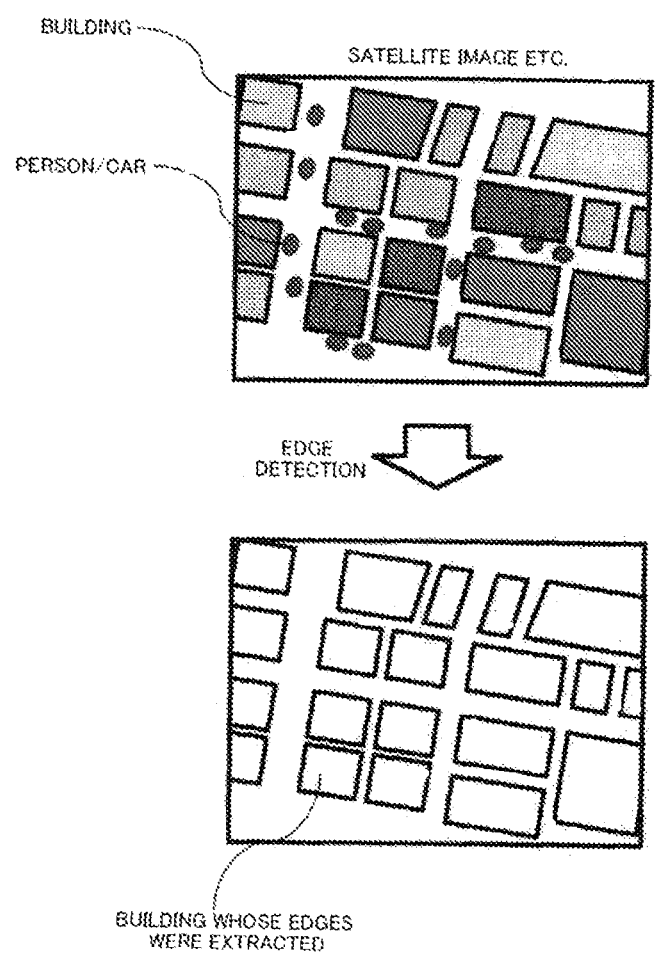
FIG. 3 is a diagram schematically showing processing in which a processing unit extracts edges of a structure in a two-dimensional image.

FIG. 3 is a diagram schematically showing processing in which the processing unit 126 extracts edges of a structure in a two-dimensional image. As shown in FIG. 3, the processing unit 126 performs processing for creating an edge image obtained by extracting only the edges of buildings that reflects radio waves from a satellite photograph (satellite image) of buildings, cars, people, and the like.

Note that the processing unit 126 removes the edges of the structure that corresponds to the transmitting station, and extracts the edges of other structures. The processing for removing the edges of the structure that corresponds to the transmitting station may be performed by the generation unit 128.

The generation unit 128 has a judgment unit 130 and a determination unit 132, and is configured to generate input data (input parameters) used for machine learning performed by the learning unit 14, based on the information received from the calculation unit 122 and the processing unit 126, and output the input data to the learning unit 14. The information input to the generation unit 128 from the calculation unit 122 and the processing unit 126 includes the position information for the transmitting station and the receiving station, the three-dimensional distance (slope distance $d_{3D}$), the free space loss $L_{FS}$, and edges (an edge image).

For example, using the position information for the transmitting station and the receiving station that was received from the calculation unit 122 and the edges (the edge image) that were received from the processing unit 126, the judgment unit 130 judges whether or not a line segment that connects the transmitting station and the receiving station intersects an edge, and outputs the judgment result to the determination unit 132.

Here, the judgment unit 130 sets the result of the judgment regarding whether or not the line segment intersects an edge as a line-of-sight judgment $F_{LOS}$. For example, if the judgment unit 130 has judged that the line segment intersects an edge, the line-of-sight judgment $F_{LOS}$ is affirmative. Also, if the judgment unit 130 has judged that the line segment does not intersect an edge, the line-of-sight judgment $F_{LOS}$ is negative.

If the judgment unit 130 has judged that the line-of-sight judgment $F_{LOS}$ is affirmative, the determination unit 132 sets a first distance ($d_{nTx}$) to the distance from the transmitting station to the nearest structure edge, and sets a second distance ($d_{nRx}$) to the distance from the receiving station to the nearest structure edge. Also, if the judgment unit 130 has judged that the line-of-sight judgment $F_{LOS}$ is negative, the determination unit 132 sets the first distance ($d_{nTx}$) and the second distance ($d_{nRx}$) to the two-dimensional distance (slope distance $d_{2D}$) between the transmitting station and the receiving station.

Note that the two-dimensional distance (slope distance $d_{2D}$(between the transmitting station and the receiving station is expressed by the following Expression 3.

[Math 3]

$$d_{2D} = \sqrt{(x_{Tx}-x_{Rx})^2+(y_{Tx}-y_{Rx})^2} \quad (3)$$

The determination unit 132 then makes a determination that the first distance ($d_{nTx}$) and the second distance ($d_{nRx}$) that were set are to be included in the input data that is to be used in the machine learning performed by the learning unit 14. The input data used in the machine learning performed by the learning unit 14 includes, for example, the three-dimensional distance (slope distance d3D), the frequency f, the free space loss $L_{FS}$, the judgment result regarding the line-of-sight judgment $F_{LOS}$, the first distance ($d_{nTx}$), and the second distance ($d_{nRx}$).

Using a neural network for example, the learning unit 14 performs machine learning with use of the above-described input data received from the generation unit 128 and the propagation loss L as learning parameters, and stores the learned model in the model storage unit 16.

Figure 4:
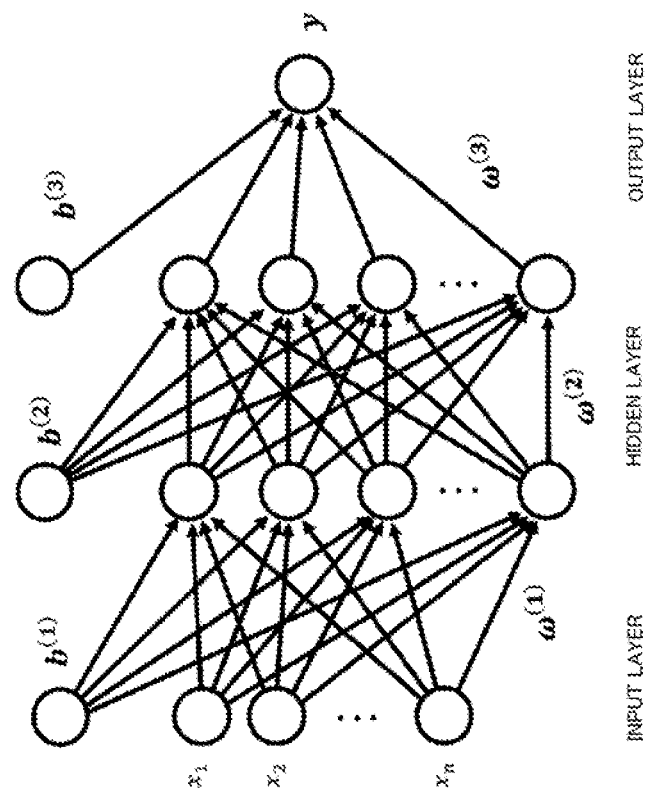
FIG. 4 is a diagram illustrating a multi-layer perceptron used by a learning unit.

FIG. 4 is a diagram illustrating a multi-layer perceptron used by the learning unit 14. In the input layer, the hidden layer, and the output layer, ω represents a weight matrix and b represents a constant term array. Using the three-dimensional distance (slope distance $d_{3D}$), the frequency f, the free space loss $L_{FS}$, the judgment result regarding the line-of-sight judgment $F_{LOS}$, the first distance ($d_{nTx}$), the second distance ($d_{nRx}$), and the like as input parameters, the learning unit 14 performs learning to adjust the weights of the layers.

The propagation characteristic estimation device 1 then estimates the propagation characteristics of radio waves between the transmitting station and the receiving station with use of the model stored in the model storage unit 16.

Figure 5:
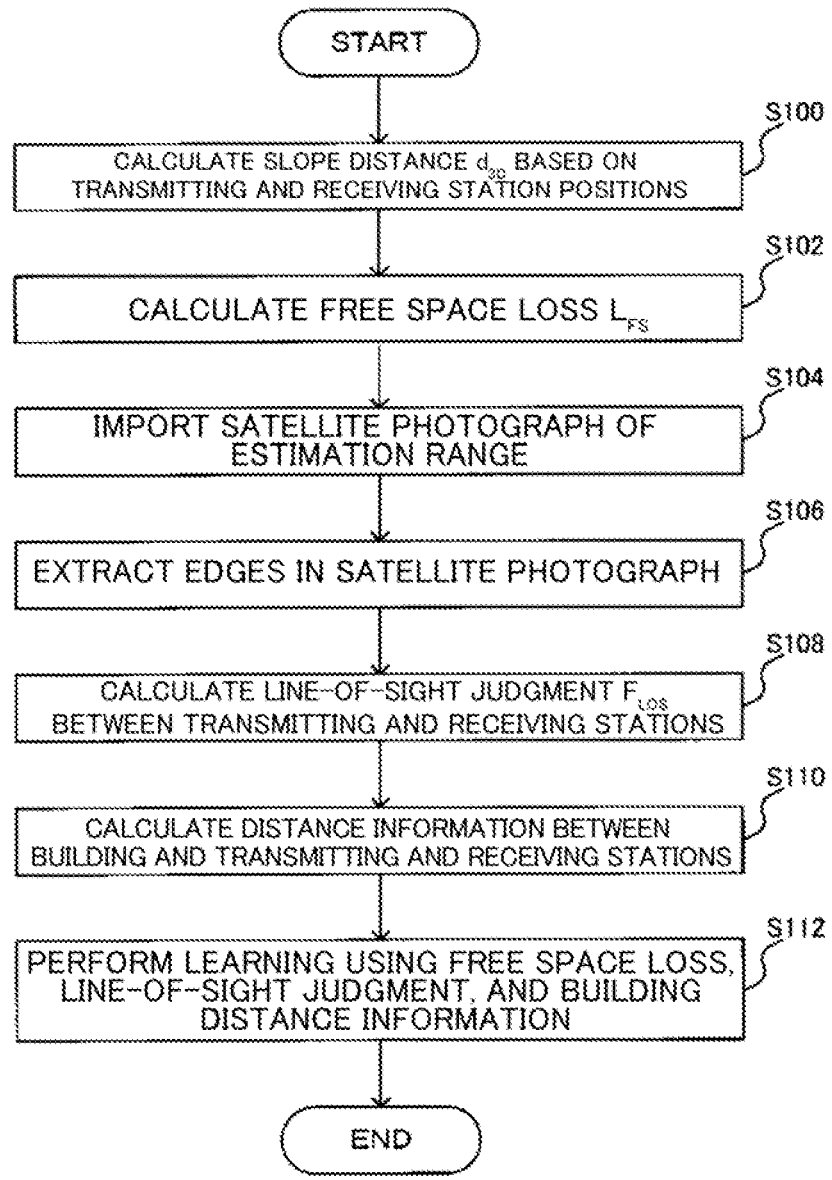
FIG. 5 is a flowchart showing an example of operations when the propagation characteristic estimation device performs machine learning.

Next, an example of operations of the propagation characteristic estimation device 1 will be described. FIG. 5 is a flowchart showing an example of operations in the case where the propagation characteristic estimation device 1 performs machine learning.

As shown in FIG. 5, in the propagation characteristic estimation device 1, the calculation unit 122 calculates the slope distance $d_{3D}$ using the positions of the transmitting station and the receiving station (transmitting and receiving station positions) (S100). Also, the calculation unit 122 calculates the free space loss $L_{FS}$ (S102).

The acquisition unit 124 imports a satellite photograph of the estimation range from the image storage unit 2 (S104), and then the processing unit 126 extracts the edges of structures such as buildings included in the satellite photograph (S106).

Next, the judgment unit 130 calculates the line-of-sight judgment $F_{LOS}$ between the transmitting and receiving stations (S108), and the determination unit 132 performs calculation to determine the distance information (the first distance ($d_{nTx}$) and the second distance ($d_{nRx}$)) between a building and the transmitting and receiving stations (S110).

The learning unit 14 performs learning using the free space loss $L_{FS}$, the judgment result regarding the line-of-sight judgment $F_{LOS}$, the distance information on the distances to the building, and the like (S112).

Figure 6:
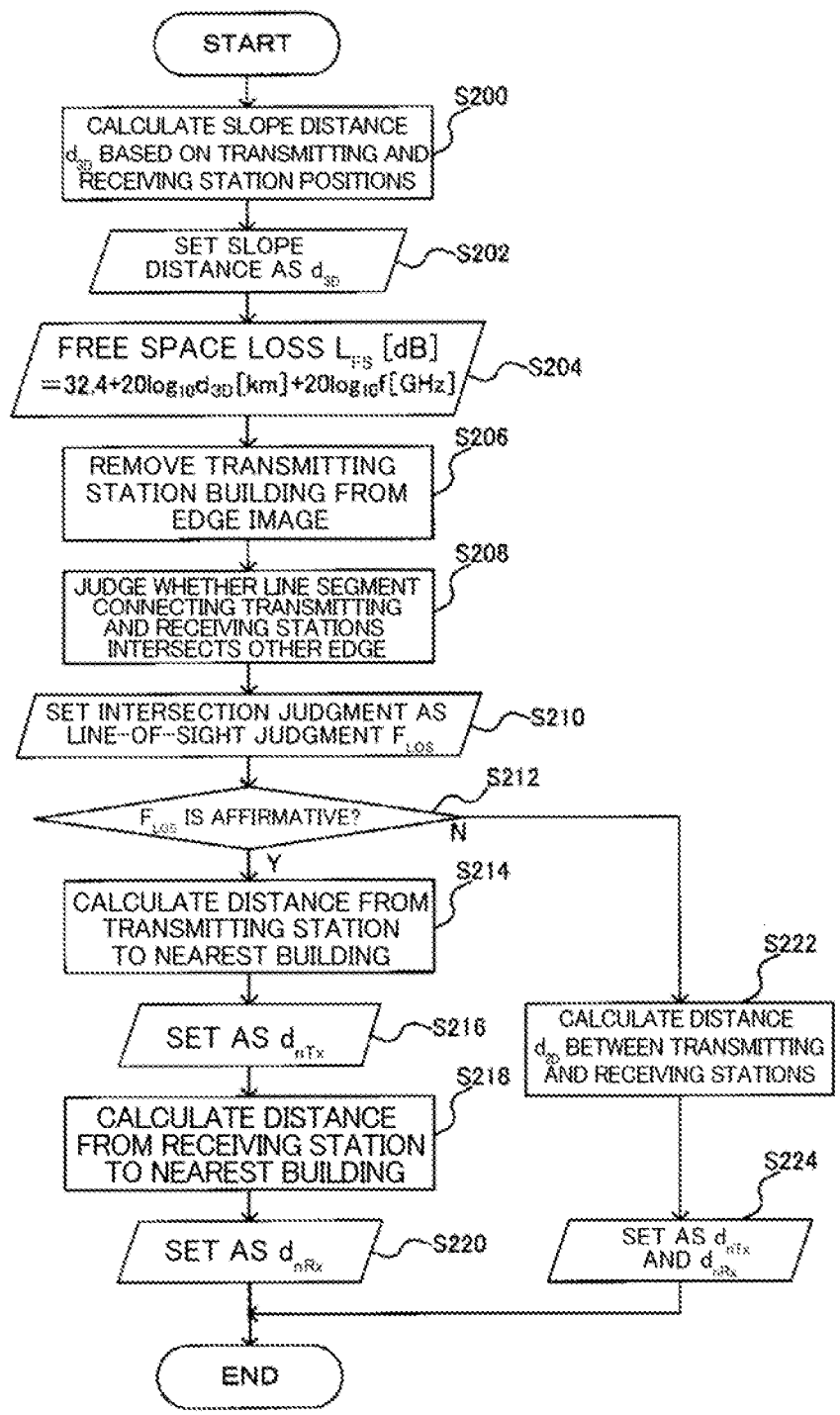
FIG. 6 is a flowchart showing a specific example of operations of an input data generation unit.

Next, a specific example of operations of the input data generation unit 12 will be described. FIG. 6 is a flowchart showing a specific example of operations of the input data generation unit 12.

As shown in FIG. 6, in the input data generation unit 12, the calculation unit 122 calculates the slope distance $d_{3D}$ using the transmitting and receiving station positions (S200), and sets the slope distance in the propagation characteristic estimation device 1 to $d_{3D}$ (S202).

Then, the calculation unit 122 calculates the free space loss $L_{FS}$ using above Expression 2 (S204).

The processing unit 126 creates an edge image from the two-dimensional image imported by the acquisition unit 124, and removes the transmitting station building from the created edge image (S206).

Next, the judgment unit 130 makes the judgment of whether or not the line segment between the transmitting and receiving stations intersects an edge (S208), and sets the result of the intersection judgment as the line-of-sight judgment $F_{LOS}$ (S210). Then, if the judgment unit 130 has judged that the line-of-sight judgment $F_{LOS}$ is affirmative (S212: Yes), the generation unit 128 moves to the processing of S214, whereas if the judgment unit 130 has judged that the line-of-sight judgment $F_{LOS}$ is negative (S212: No), the generation unit 128 moves to the processing of S222.

The determination unit 132 calculates the distance from the transmitting station to the nearest building (S214) and sets that distance as the first distance ($d_{nTx}$) (S216). Also, the determination unit 132 calculates the distance from the receiving station to the nearest building (S218), and sets that distance as the second distance ($d_{nRx}$) (S220).

In the processing of S222, the determination unit 132 calculates the distance between the transmitting and receiving stations (slope distance $d_{2D}$), and sets that distance as the first distance ($d_{nTx}$) and the second distance ($d_{nRx}$) (S224).

In this way, using a two-dimensional image of a region that includes a transmitting station and a receiving station, the propagation characteristic estimation device 1 extracts edges of structures in a two-dimensional image and generates input data that is to be used for machine learning, thus making it possible to reduce the storage capacity and reading time required for data that is needed to estimate the propagation characteristics of radio waves.

Note that some or all of the functions of the propagation characteristic estimation device 1 may be constituted by hardware, or may be constituted as a program executed by a processor such as a CPU.

In other words, the propagation characteristic estimation device 1 according to the present invention can be realized using a computer and a program, and the program can be recorded on a storage medium or provided through a network.

Figure 7:
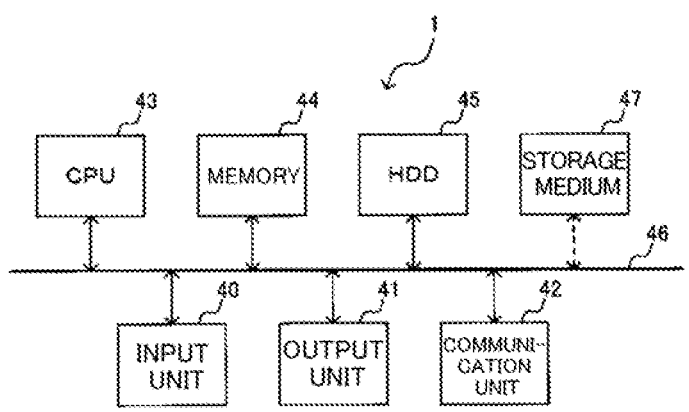
FIG. 7 is a diagram showing an example of the hardware configuration of the propagation characteristic estimation device according to an embodiment.

FIG. 7 is a diagram showing an example of the hardware configuration of the propagation characteristic estimation device 1 according to the embodiment. As shown in FIG. 7, in the propagation characteristic estimation device 1, an input unit 40, an output unit 41, a communication unit 42, a CPU 43, a memory 44, and an HDD 45 are connected via a bus 46, for example, and function as a computer. Also, the propagation characteristic estimation device 1 is capable of inputting data to the storage medium 47 and receiving data therefrom.

The input unit 40 is a keyboard, a mouse, or the like, and corresponds to the above-mentioned input unit 10. The output unit 41 is a display device such as a display. The communication unit 42 is a wired and wireless network interface, for example.

The CPU 43 controls the units that constitute the propagation characteristic estimation device 1, and performs the above-described calculation and the like. The memory 44 and the HDD 45 constitute a storage unit for storing data. In particular, the memory 44 stores the data used in the above-described calculation. The storage medium 47 is capable of storing a propagation characteristic estimation program or the like that executes the functions of the propagation characteristic estimation device 1. Note that the architecture that constitutes the propagation characteristic estimation device 1 is not limited to the example shown in FIG. 7

The embodiments described above are given as examples of embodiments of the present invention, rather than limiting the present invention, and the present invention can also be implemented in various other variations and modified embodiments.

REFERENCE SIGNS LIST

1 Propagation characteristic estimation device
2 Image storage unit
10 Input unit
12 Input data generation unit
14 Learning unit
16 Model storage unit
40 Input unit
41 Output unit
42 Communication unit
43 CPU
44 Memory
45 HDD
46 Bus
47 Storage medium
120 Extraction unit
122 Calculation unit
124 Acquisition unit
126 Processing unit
128 Generation unit
130 Judgment unit
132 Determination unit

The invention claimed is:

1. A propagation characteristic estimation device for estimating a propagation characteristic of radio waves between a transmitting station and a receiving station that perform wireless communication, the propagation characteristic estimation device comprising:
a processor; and
a storage medium having computer program instructions stored thereon, when executed by the processor, perform to:
based on input information from an external source, extract position information regarding the transmitting station and the receiving station and a frequency of radio waves transmitted by the transmitting station;
calculate a three-dimensional distance between the transmitting station and the receiving station and a free space loss of radio waves based on the position information and the frequency;
perform processing for, with use of a two-dimensional image of a region that includes the transmitting station and the receiving station, extracting an edge of a structure that reflects radio waves in the two-dimensional image;
generate input data for use in machine learning, based on the position information, the three-dimensional distance, the free space loss, and the edge; and
perform machine learning to estimate a propagation characteristic of radio waves between the transmitting station and the receiving station with use of the input data generated by the generation unit.

2. The propagation characteristic estimation device according to claim 1, wherein the computer program instructions further perform to
judge whether or not a line segment that connects the transmitting station and the receiving station intersects the edge, and
in a case where the judgment unit judged that the line segment and the edge intersect, set a first distance to a distance from the transmitting station to a nearest structure edge and set a second distance to a distance from the receiving station to a nearest structure edge, in a case where the judgment unit judged that the line segment and the edge do not intersect, set the first distance and the second distance to a two-dimensional distance between the transmitting station and the receiving station, and make a determination that the first distance and the second distance that were set are to be included in the input data.

3. A propagation characteristic estimation method for estimating a propagation characteristic of radio waves between a transmitting station and a receiving station that perform wireless communication, the propagation characteristic estimation method comprising:
an extraction step of, based on input information from an external source, extracting position information regarding the transmitting station and the receiving station and a frequency of radio waves transmitted by the transmitting station;
a calculation step of calculating a three-dimensional distance between the transmitting station and the receiving station and a free space loss of radio waves based on the position information and the frequency;
a processing step of performing processing for, with use of a two-dimensional image of a region that includes the transmitting station and the receiving station, extracting an edge of a structure that reflects radio waves in the two-dimensional image;
a generation step of generating input data for use in machine learning, based on the position information, the three-dimensional distance, the free space loss, and the edge; and
a learning step of performing machine learning to estimate a propagation characteristic of radio waves between the transmitting station and the receiving station with use of the input data that was generated.

4. The propagation characteristic estimation method according to claim 3,
wherein the generation step includes
a judgment step of judging whether or not a line segment that connects the transmitting station and the receiving station intersects the edge, and
a determination step of, in a case where it was judged that the line segment and the edge intersect, setting a first distance to a distance from the transmitting station to a nearest structure edge and setting a second distance to a distance from the receiving station to a nearest structure edge, in a case where it was judged that the line segment and the edge do not intersect, setting the first distance and the second distance to a two-dimensional distance between the transmitting station and the receiving station, and making a determination that the first distance and the second distance that were set are to be included in the input data.

* * * * *